United States Patent [19]

Ulrich et al.

[11] Patent Number: 5,326,541
[45] Date of Patent: Jul. 5, 1994

[54] DEVICE FOR SUBSTANCE SEPARATION FROM A LIQUID MIXTURE BY CRYSTALLIZATION, AND METHOD

[75] Inventors: Joachim Ulrich; Manfred Stepanski; Yavus Oezoguz, all of Bremen, Fed. Rep. of Germany

[73] Assignees: Gebrüder Sulzer Aktiengesellschaft, Winterthur, Switzerland; Sandvik Process Systems GmbH, Fellbach, Fed. Rep. of Germany

[21] Appl. No.: 798,283

[22] Filed: Nov. 25, 1991

[30] Foreign Application Priority Data

Nov. 27, 1990 [CH] Switzerland .................. 03750/90

[51] Int. Cl.⁵ .......................... B01D 9/00; C13K 1/10
[52] U.S. Cl. ................................. 422/254; 23/295 R
[58] Field of Search .............. 422/254, 247, 245; 23/293 R, 293 S, 295 R

[56] References Cited

U.S. PATENT DOCUMENTS

| | | | |
|---|---|---|---|
| 3,010,802 | 11/1961 | Schwek et al. | 23/293 R |
| 3,011,878 | 12/1961 | Lackey et al. | 23/293 R |
| 3,603,103 | 9/1971 | Richmond et al. | 62/58 |
| 3,612,664 | 10/1971 | Berman | 350/179 |
| 3,932,142 | 1/1976 | de Vries et al. | 422/254 |
| 4,443,412 | 4/1984 | Schermutzki et al. | 422/254 |

FOREIGN PATENT DOCUMENTS

| | | |
|---|---|---|
| 0063688 | 11/1982 | European Pat. Off. . |
| 0167401 | 1/1986 | European Pat. Off. . |
| 925919 | 9/1947 | France . |
| 1220220 | 5/1960 | France . |
| 1124995 | 11/1984 | U.S.S.R. ........... 422/254 |
| 1274712 | 12/1986 | U.S.S.R. ........... 422/254 |

OTHER PUBLICATIONS

S. J. Jancic, "The Sulzer MWB Fractional Crystallization System" Sulzer Technical Review Apr. 1985.

*Primary Examiner*—Gary P. Straub
*Attorney, Agent, or Firm*—Frishauf, Holtz, Goodman & Woodward

[57] ABSTRACT

An endless steel band or belt (12) moves upwardly (see arrow 65). The upper length or run (17) of the band or belt (12) is cooled or heated by a fluid flowing from nozzles (43, 59). A feeding station (21) supplies a liquid mixture which mixture runs downwardly along the crystallizing surface (11) of the belt. A crystal layer is thus formed on the crystallizing surface 11. This crystal layer is moved upwardly in counter-current. The remaining liquid, the mother liquor, which is substantially free from crystallizable substance, flows downwardly. A device (22) for changing the inclination angle ($\alpha$) of the crystallizing surface permits the crystallizing device to be adjusted in a simple way in accordance with the requirement of the crystallizating process. For automatic operation, a control unit (C) can associate the angle of inclination ($\alpha$), the speed of movement of the band or belt (12), and hence of the crystallization surface (11) thereon and the temperature profile of the crystallization surface for optimum crystallization.

13 Claims, 1 Drawing Sheet

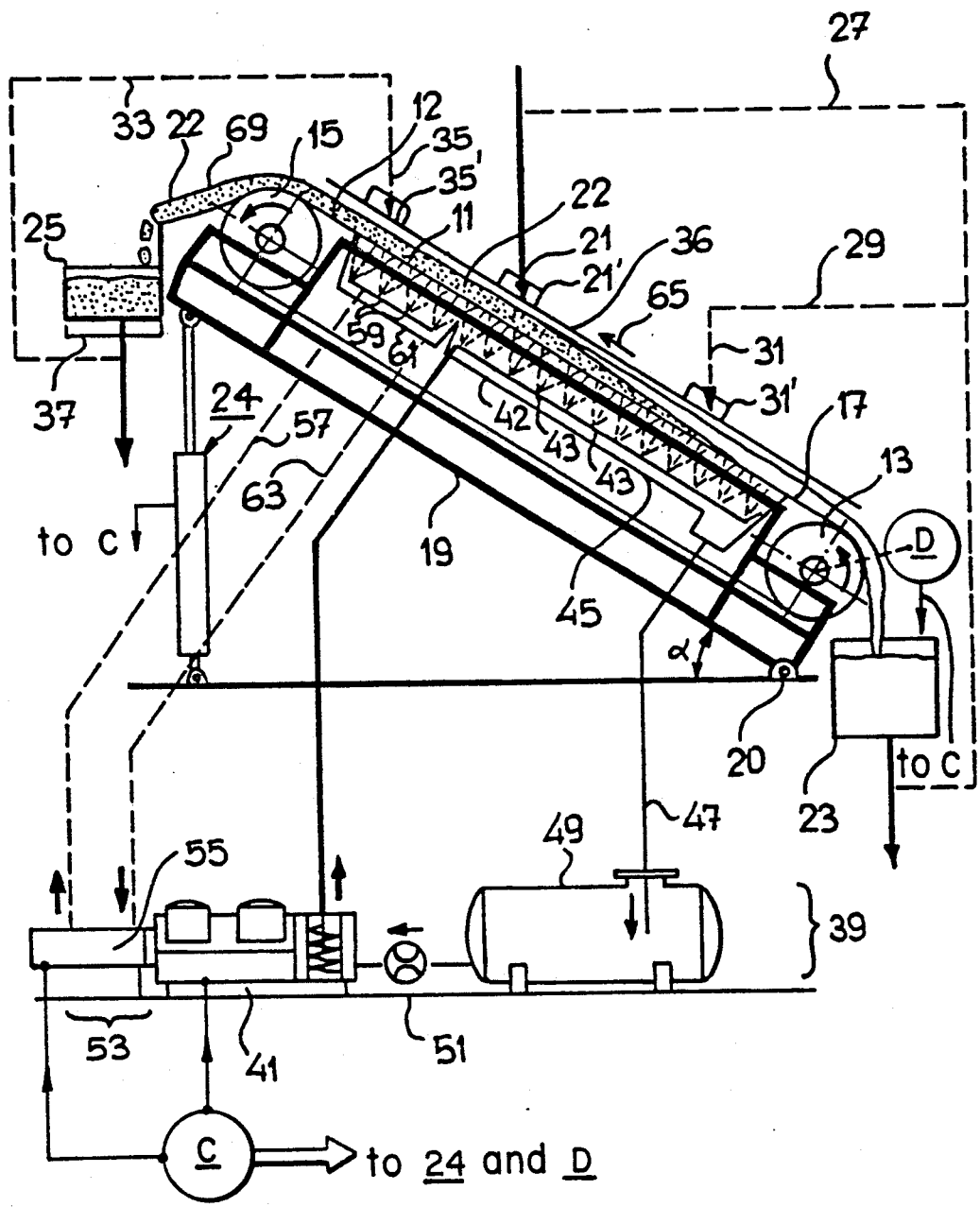

DEVICE FOR SUBSTANCE SEPARATION FROM A LIQUID MIXTURE BY CRYSTALLIZATION, AND METHOD

FIELD OF THE INVENTION

The invention relates to a device and method for substance separation from a liquid mixture by crystallization. The device has a crystallization surface provided by one side of a length or run of an endless band or belt, said length of band being inclined at an angle, drive means for the endless band, cooling or heating means for cooling or heating the other side of said length of band, and at least one feeding station for applying the liquid mixture to the crystallization surface.

BACKGROUND

U.S. Pat. No. 3,612,664, to which German 17 69 123 corresponds, describes a method and a device for substance separation from a liquid mixture by means of fractional crystallization. In this method the liquid mixture is flowing in turbulence over indirectly cooled crystallization surfaces, and the crystal layer, after reaching a certain thickness, is removed by melting from the crystallization surface. For this prior art layer crystallization method, a crystallizer is used in which the vertical cooled, or in special cases heated walls are provided by a number of vertical tubes arranged in parallel. The liquid mixture flows inside of the tubes from the top to the bottom in form of an thin film, whereas on the outside of the tubes the coolant is present. The coolant flowing as a thin film on the outside of the crystallizer tubes provides, by undercooling, local crystallizing centres in the thin film flowing on the inner wall. The local crystallizing centres grow together to a continuous layer. From time to time, when the deposited crystal layer reaches a certain thickness, it is melted. This method has the disadvantage that it is necessarily discontinuous, and therefore, after each cycle, the whole device must be heated and cooled. This requires a substantial amount of energy and increases the cycle time. Normally, the described method is carried out in different stages, because the purity of the crystallized product is relatively limited due to the high temperature gradients and the small substance transfer areas. The cited literature proposes to carry out fractionating in cycles of different steps or stages. As melting liquid for the crystals from stage N-1 the mother liquor of the stage N+1 of the previous cycle is used, and the mother liquor of stage N is used as melting liquid for the crystals of stage N-2 of the following cycle. This method became known as the Sulzer-MWB crystallization method (see S. J. Jancic, "The Sulzer-MWB Fractional Crystallization System", Sulzer Technical Review, April, 1988).

The U.S. Pat. No. 3 603 103 discloses a method in which crystals produced by a cooler provided with a scraping mechanism are fed into the middle of a column. In this column the crystals and the liquid mixture to be purified, often also called melt, are fed in counter-current. The temperature of the melt is controlled in such a way that the crystals are growing on their passing through the column. At the end of the column the crystals are melted. The melted crystals are partly removed as final product and partly returned in counter-current to the growing crystals in the column. At the other end of the column the highly impure rest, the so-called mother liquor, is withdrawn. This method has the advantage that it is continuous. The counter-current provides intensive substance exchange. However, this method hat the disadvantage that strong axial mixing takes place. Accordingly, the separation effect obtained by crystallization is substantially reversed. The growing crystals transport adhering melt, and the melt flowing in counter-current transports small crystals.

The European published application 0 167 401 shows a crystallization device for separating or purifying organic substances. This crystallization device comprises three vertical concentric hollow cylinders. Between the inner and the middle hollow cylinder is a first interspace for receiving a cooling fluid. Between the middle and the exterior hollow cylinder is a second interspace for receiving the melt to be purified. The outside of the middle hollow cylinder forms the crystallizing surface. The first interspace has an inlet and an outlet for the cooling fluid. The second interspace has an inlet for the melt to be purified and an outlet for the melted crystallization product, that is the pure product, and an outlet for the impure product. Diametrically opposite to the inlet for the melt to be purified a barrier is located in the second interspace to prevent the flowing-through of melted crystallized product. An electric heater is used to melt the crystallized product. In operating the crystallizing device the crystallizing surface rotates slowly in direction to the outlet for the pure product. On this path a crystal layer is formed on the crystallizing surface. This crystal layer is melted by the electric heater. Depending on the setting of the outlet valve, more or less of the melted crystallization product is flowing through the outlet, whereas the rest flows back in the second interspace toward the inlet, is mixed with the melt to be purified, and flows further toward the outlet for the impure product. On this path, crystals are further deposited on the crystallization surface. Because on this path the melt contains less and less material crystallizable at a temperature of the crystallization surface, hardly any crystallization takes anymore place near the outlet for the impure product. At the outlet for the impure product a valve is provided. Further, a pump is provided to backfeed, if desired, a part of the impure product to the inlet for further crystallization.

The described crystallization device has, in particular, the disadvantage that the cooling liquid in the first interspace provides over the whole crystallization surface is practically at the same temperature. Accordingly, already in case of a relatively thin thickness of the crystallization layer practically no crystallization takes place anymore. Therefore, the yield remains relatively small. A further disadvantage is that the speed of backflow of the melted crystallized product is not everywhere the same, because of friction, faster cooling at the edges, and flow of a partial stream through the outlet. Further no controlled sweating is possible.

The published European patent application 0 063 688 discloses a crystallizing device which, in particular, can be used for undercooled melt. The device comprises a precrystallization device and a horizontal cooling band and has the purpose to provide an optimum nucleation speed and a high nucleation number also without the necessity of adding additional seeding material to the precrystallization device. In the precrystallization device nucleation is initiated in a thin film, and crystallization takes place on the cooling band to which the precrystallized melt is applied in a thick layer. This crystallization device was created especially for the solidification of undercooled melts, and the patent application does not contain any suggestion how a substance separation by crystallization could take place with the device shown.

The French patent 1 220 220 discloses a number of different crystallization devices, one of them having an inclined crystallizing surface. This crystallizing surface is formed by one side of a length of an endless band. Under this length of band is a cooling device, and above the length of band is a feeding station for feeding the liquid mixture on the crystallizing surface. This device has the disadvantage that the inclination of the inclined crystallizing surface can not be changed. A further disadvantage is that the cooling device has no freely selectable temperature profile over the length of the crystallizing surface. Also no return line is provided to permit washing of the crystal layer.

THE INVENTION

It is an object to provide a device and method in which the abovementioned disadvantages are avoided as far as possible.

Briefly, means for changing the inclination angle of an endless band crystallization surface is provided. The device thereby permits an energy saving continuous operation. In contrast to the prior art layer crystallization there is no periodic change between steps of crystallization and of melting of crystals, where on melting the mother liquor and the melted crystallization product flow downward. Rather, there is a counter-current which the crystallized product and the liquid mixture to be purified move in opposite directions. The device permits not only a continuous operation, but has also the advantage that because of the counter-current no axial backmixing takes place. Accordingly, product separation is very good. There are no suspended crystals, which are dragged along with the liquid mixture. In comparison to suspended crystals the boundary area between the crystal layer and the liquid mixture is smaller by several orders of magnitude. Accordingly, the amount of liquid mixture dragged along by the crystallized product is very small. The transport of the liquid mixture over the crystallization surface takes place by the action of gravity.

The liquid mixture can flow downwardly as a thin film. This permits a substantially uniform wetting of the crystallization surface or of the already formed crystal layer. The means for changing the inclination angle permits adaptation of the device in a simple manner to the requirements of the method. Depending on the product to be handled these requirements may vary considerably. By adjusting the inclination angle the dwell time of the liquid mixture on the crystallization surface or on the crystal layer can be regulated. The inclination angle is an influencing factor for changing the relative velocity between crystal layer and melt. The drive means for the belt are preferably speed-controllable. This permits to tune the band velocity to the flow velocity. This, together with the adjustment of the inclination angle, permits an optimizing of the separation action.

Preferably, means are provided for impressing a temperature profile on the crystallization surface in direction of flow of the liquid mixture. In this way a compensation of the insulation by the crystal layer can be obtained, so that over the whole effective band length a uniform crystal growth speed is obtained. It is also possible to carry out different process steps with one device by designating an active band length for each process step by suitable selection of the temperature profile.

It is possible to provide a return line for mother liquor to a first feeding station. In this way an additional crystallization from the mother liquor can be obtained. However, it is also possible to provide a return line for mother liquor to a second feeding station located downstream from the first feeding station. In certain cases it is advisable to provide a plurality of second feeding stations located behind each other in direction of flow. Also in this way a further crystallization of the desired product out of the mother liquor is obtained. This permits a further optimizing of the process.

It is of advantage to provide a return line for crystallization product to a third feeding station, which is located upstream from the first feeding station. This permits to wash the crystallized product located on the crystallization surface. In this way mother liquor attached to the crystallized product and eventual crystallized product melted by sweating will be washed away.

To permit sweating, means may be provided with which the underside of the upper band length can be heated by a fluidum at a location upstream from the first feeding station. By these or other means the crystallized product located on the crystallizing surface may be caused to sweat. Sweating, that is partial melting, is obtained by a suitable selection of temperature. The fraction with a lower melting point, that is the fraction representing impurities, melts. The melted impurities emerge from the crystallization layer in form of drops. Because they remind to sweat drops, this operation is called sweating. On the present method the melted fraction runs downward and can be removed downstream mixed together with mother liquor.

An advantage of the described embodiment consists in that crystallization and sweating can take place at the same time in the same crystallization device, so that no additional apparatus and no additional time are required.

The device for substance separation preferably comprises a stripper for removing the crystallized product. This has the advantage that the crystallized products is obtained in form of flakes. In contrast to the state of the art, where the product is obtained in liquid form, no additional devices are necessary to obtain flakes.

According to an advantageous embodiment of the invention the endless band, the cooling and/or heating means, and the feeding station or stations are on a frame tiltable around an axis. This has the advantage that when the inclination of the crystallization surface is changed, no other parts of the device must be adjusted.

It is of advantage to have each feeding station movable on a sledge along a rail located parallel to the upper length of the band. This permits an easy adjustment of the feeding station and permits in such a way to select the active length of crystallization, washing and sweating areas. Such adjustment may also take place during operation of the device. By the selection of the length of the active zone and the selection of the temperature profile it is also possible to carry out a multi-stage crystallization process with only one device.

The invention permits use of the device for the Sulzer-MWB process. It has the advantage that multi-stage crystallization can take place in a single crystallization device.

BRIEF DESCRIPTION OF THE DRAWINGS

An embodiment of the invention will now be described with reference to the single figure of the drawing.

DETAILED DESCRIPTION

The schematically shown device for continuous crystallization has an endless crystallization surface 11. The crystallization surface 11 is formed by the upper side of an endless band or belt 12, which is guided over a lower roller 13 and an upper roller 15. At any given moment only the upper side of the upper band length or run 17 acts as crystallization surface. The endless band 12 is preferably a metal band, e.g. a steel band.

Other materials may be used, if they have sufficient thermal conductivity. By drive means D, shown only schematically, roller 13 is driven in direction of the arrow; alternatively, roller 15 can be driven. The rollers 13, 15 are located in a frame 19.

In accordance with a feature of the invention, frame 19 is tiltable around the axis 20 to permit changing of the inclination angle α. A hydraulic cylinder may be used as adjusting device 24. Because the upper band run 17 is inclined at the inclination angle, gravity can be used to move the liquid mixture on the crystallization surface 11.

A reference numeral 21 refers to a first feeding station for applying the liquid mixture to the crystallization surface 11. This feeding station 21 is located approximately in the middle or above the middle of the band length or run 17. Reference numeral 23 refers to a container for mother liquid, and reference numeral 25 refers to a container for the crystallized product. From the container 23 a return line 27 leads to the first feeding station 21 and a branch return line 29 leads to a second feeding station 31. The second feeding station 31 is located downstream from the first feeding station 21 approximately in the lower quarter of the band length 17. It can be selectively connected to or severed from line 27. Return line 33 leads from the container 25 to a third feeding station 35 located upstream from the first feeding station 21. Each feeding station 21, 31, 35 is movable on a carriage or sled 21', 31', 35' along a rail 36. Accordingly, the feeding station or stations may be moved along the crystallization surface 11. A heating means 37 serves to melt the crystallized product in the container 25 to permit back-feeding of crystallized product through the return line 33. A cooling device 39 consists substantially of a cooling aggregate 41, a line 42 with a plurality of nozzles 43, a collection trough 45, a return line 47, a tank 49 for cooling fluid, and a pump 51. By means of nozzles 43 the lower side of the upper band length 17 can be cooled by a fluid, for example water. If the melting point of the crystallized product is above ambient temperature, heating may take place instead of cooling.

The cooling of the band length 17 on the underside can be effected by controlling the temperature and the amount of the cooling fluid at the place of action, that is the nozzle or nozzles 43, in such a way that the desired temperature profile is impressed on the crystallization surface 11. For example, this can be employed to compensate for the heat insulation effect due to the crystal layer. A temperature control provides a temperature profile which permits controlling the energy balance independently of the mass balance. For automatic operation, angle of inclination α of the belt run 17 as well as speed of belt 12 and the temperature profile can all be controlled by a control unit C, as schematically shown by arrows between unit C and elements D, 24, 41 and 53.

A heating device 53 is provided with which the underside of the upper band length 17 can be heated by a fluid at a location upstream from the first feeding station to cause sweating of the crystallized product. For this purpose the waste heat of the cooling aggregate 41 can be used. With this waste heat a tank is heated. From this tank the heating medium is fed over the line 57 to the nozzles 59, which direct the heating medium against the underside of the upper band length 17. From the trough 61 and the line 63 the heating medium can flow back into the tank 55.

OPERATION

In operation of the device the upper length 17 is moving in direction of arrow 65. The liquid mixture to be fractionated by crystallization is applied to the crystallization surface 11 at the feeding station 21. The liquid mixture is flowing down on the crystallization surface. On the crystallization surface 11 a crystal layer 22 is formed, which is moved up with the band 12. The remaining liquid, the so called mother liquor, which is substantially free of crystallizable substance, flows down into the container 23. Eventually, the mother liquor may be recirculated over the lines 27 and/or 29 to precipitate further crystallizable substance still contained in the mother liquor. The crystallized product is caused to sweat by heating the crystallizing surface 11 in the upper part of the band length 17. By a stripper 69 the crystallized product is removed into the container 25. Eventually, crystallized product melted by the heating device 37 may be returned over the line 33 to wash crystallized product located on the crystallization surface 11, that is, to remove rests of mother liquor and/or sweat still adhering to the crystallized product. Associating the speed of belt 12, angle α, and the temperature profile of surface 11 ensures optimum operating conditions for crystallization of the substance from the liquid mixture.

A few simple experiments relating speed of belt 12, inclination angle α, and the temperature profile of surface 11 can determine optimum crystallization conditions for various substances to be separated from carrier liquids. It is possible to connect several such crystallization devices in series to obtain multi-stage crystallization. It is also possible to carry out a multi-stage crystallization with a single crystallization device according to the Sulzer-MWB process.

We claim:

1. An endless belt separator device for separating a substance from a liquid mixture by crystallization,
said device comprising
an elongated endless band or belt (12) defining an upper run (17) and a lower, or return run, and wherein the surfaces of said endless belt define an inner side and an outer side;
a crystallization surface (11) formed on the outer side of said upper run (17) of the endless band or belt (12);
mounting means (19, 20, 24) for mounting said upper run of the band or belt at an angle of inclination (α) which places one end portion of said endless band or belt at a higher elevation, with respect to a horizontal plane and defining an upper end portion, that an opposite, or lower end portion of the upper run;

at least one feeding station (21, 31, 35) for applying the liquid mixture onto the crystallization surface (11) at a level above said lower end portion;

speed controllable drive means (D, 13) coupled to said endless band or belt for driving said endless band or belt in a direction such that the upper run of said band or belt runs upwardly;

means (39, 42, 43, 45) for controlling the temperature, by selective cooling or heating, of said upper run (17) of the band or belt (21) and hence of said crystallization surface (11), said temperature control means being located in heat transfer relation with respect to said upper run, said temperature control means including a plurality of heat exchange means (43, 59) forming a plurality of temperature zones on said crystallization surface, and thereby forming a temperature profile on said crystallization surface along the length thereof, in which the temperature at said upper end portion will differ from the temperature of the lower end portion and vary between a higher and a lower temperature on said crystallization surface;

a control unit (C) controlling the speed of operation of said drive means (D) and hence of said endless band or belt (12), and said temperature control means (39, 42, 43, 45) to thereby control the temperature profile on said crystallization surface (11); and wherein said mounting means comprise adjustable means (24) for adjusting said angle of inclination (α) and for setting said angle at a level as a function of the liquid mixture and the substance to be crystallized therefrom at said controlled speed of said drive means (D) and said temperature profile controlled by said temperature control means (39, 42, 43, 45).

2. The device of claim 1, wherein a plurality of feeding stations (21, 31) are provided, located along the length of said upper run (17) of said endless band or belt (12); and further including a return line (27) for mother liquor to that one of the feeding stations (21) which has a higher level than another feeding station of said plurality of feeding stations.

3. The device of claim 2, further including a return line (29) for mother liquor to a feeding station (31) located downstream and at a lower level than said higher feeding station.

4. The device of claim 1, wherein a plurality of feeding stations (21, 31, 35) are provided located along said run or length (17) of the endless band or belt (12) and positioned staggered along said length in the direction of flow of liquid mixture over said crystallization surface.

5. The device of claim 4, further including a return line (33) for crystallization products, and wherein one (35) of said plurality of feeding stations defines a return feeding station (35) located upstream from another one of said feeding stations (21) and applies crystallized products to the crystallization surface (11).

6. The device of claim 1, wherein the temperature control means include means (53) for sweating crystallized products on said crystallization surface (11), said sweating means including heated fluid application means (57, 59, 61, 63) applying heated fluid to the inner side of said upper run (17) of said endless band or belt (12), said sweating means being positioned upstream, in the direction of driven movement of said endless band or belt (12) from said at least one feeding station (21).

7. The device of claim 1, further including a stripper (69) for removing crystallized product, located adjacent an uppermost portion of said inclined endless band or belt (12).

8. The device of claim 1, wherein said mounting means includes a frame (19) having one end portion pivotable about an essentially horizontal axis (20) extending transversely with respect to said crystallization surface (11) for controllably setting said angle of inclination (α), said frame retaining said endless band or belt (12) and said at least one feeding station (21, 31, 35).

9. The device of claim 1, wherein a plurality of feeding stations (21, 31, 35) are provided; and further including a sled (21', 31', 35) movable along a rail (36) located parallel to the upper length or run (17) of the band or belt (12) and supporting said feeding stations.

10. The device of claim 9, wherein said mounting means includes a frame (19) having one end portion pivotable about an essentially horizontal axis (20) extending transversely with respect to said crystallization surface (11) for controllably setting said angle of inclination (α), said frame retaining said endless band or belt (12); and wherein said rail (36) is secured to said frame (19).

11. The device of claim 1, wherein said control unit (C) further controls the angle of inclination (α) of the upper run of the band or belt, and hence of said crystallization surface.

12. The device of claim 11, wherein said control unit (C) simultaneously controls the speed of operation of said drive means (D) and hence of said crystallization surface and said temperature control means.

13. The device of claim 11, wherein said control means (C) simultaneously controls the angle of inclination (α) of said upper run of the band or belt, and hence of said crystallization surface (11), said temperature control means, and said drive means (D) and the speed of operation of said drive means (D).

* * * * *